Dec. 18, 1928.

P. B. CAMP 1,696,148

DYNAMOMETER

Filed May 21, 1925

Inventor:
Percy B. Camp
By Gillson, Mann & Cox,
Attys.

Patented Dec. 18, 1928.

1,696,148

UNITED STATES PATENT OFFICE.

PERCY B. CAMP, OF MAYWOOD, ILLINOIS, ASSIGNOR TO UNIVERSAL DRAFT GEAR ATTACHMENT CO., A CORPORATION OF ILLINOIS.

DYNAMOMETER.

Application filed May 21, 1925. Serial No. 31,765.

This invention relates to dynamometers and has for its principal object to prevent injury to the operating mechanism upon a sudden release of the strain being tested.

Further objects and advantages will become apparent as the disclosure proceeds and the description is read in connection with the accompanying drawings, in which Fig. 1 is a rear elevation of a dynamometer including this invention;

Figure 1:
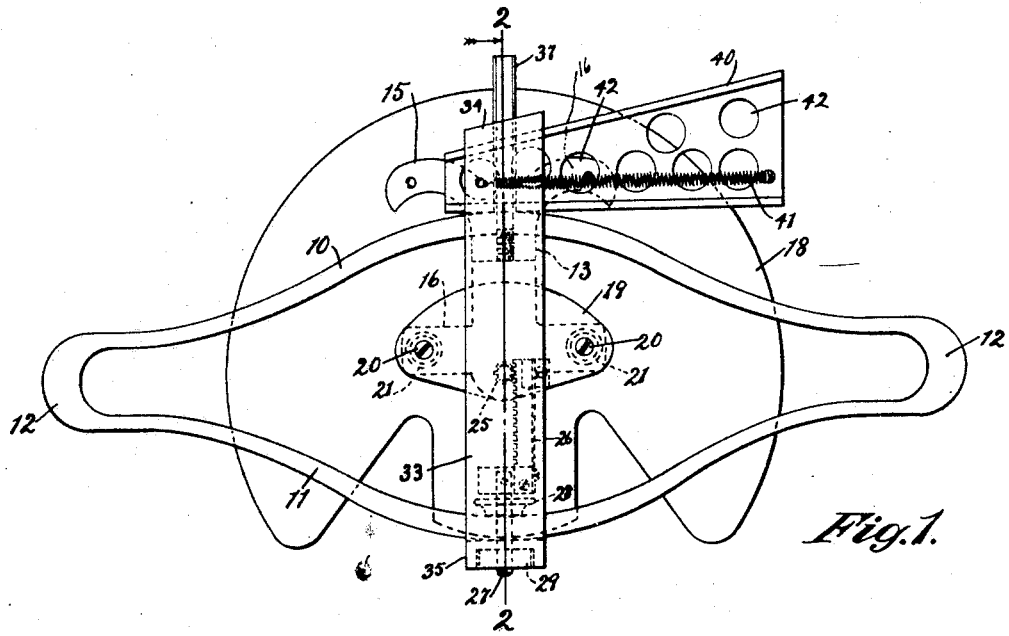

The basic organization of these instruments is a spring device including two members which have relative movement when the strain to be tested is applied. In the present instance, this is illustrated as a spring of generally elliptical form including opposed elements 10 and 11, connected at their ends by bights or loops 12 to which chains or the like may be secured in connecting the dynamometer with the force to be tested.

The upper element 10 has fixed to it a bracket 13 having at one side a generally upright portion 14 equipped with laterally extending arms 15 and 16, which receive screws 17 and secure a dial 18 to the frame. A block or plate 19 is secured to the upright 14 by suitable bolts 20 and held in spaced relation thereto by spools 21. A needle spindle 22 is journaled in aligned bearings in the upright portion 14 and the block or plate 19 and carries a needle 23 which indicates, in suitable units, the measure of the strain applied to the bights 12.

Usually a second needle 24 is loosely mounted on the spindle and frictionally connected with the dial so that it remains at the point of greatest movement of the needle 23, to preserve a record of maximum strength.

The spindle 22 is equipped with a pinion 25 meshing with a rack 26 fixed to a base block 27' which, in turn, is secured to the lower element 11 of the spring device by a bolt 27 and nuts 28 and 29 adjustably mounted thereon.

Figures 2, 3:
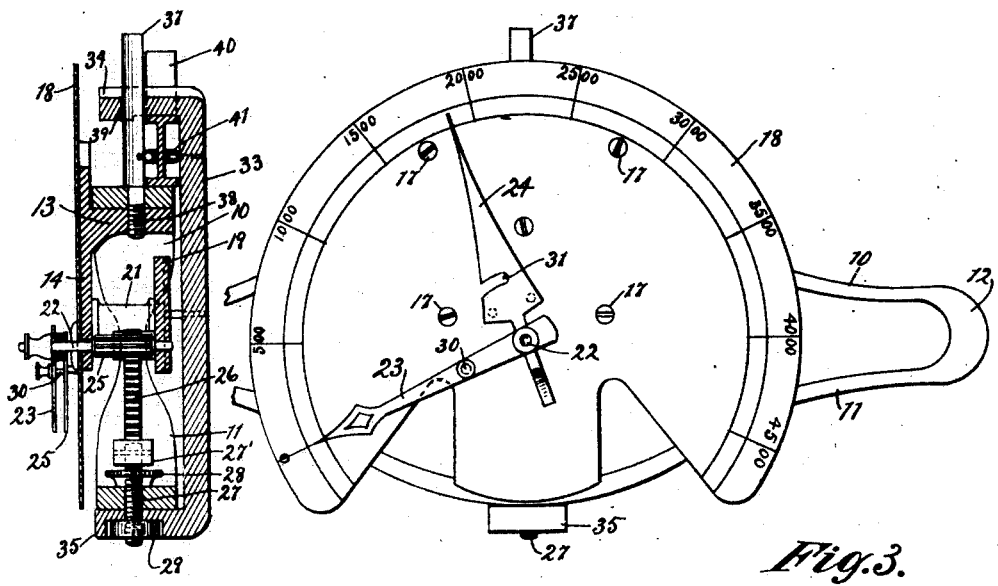
Fig. 2 is a transverse section taken on the line 2—2 of Fig. 1.
Fig. 3 is a front elevation of such a dynamometer.

When the strain is applied, the elements 10 and 11 approach each other causing the rack 26 to rotate the pinion 25 and thus move the needle 23 in a clockwise direction in Fig. 3. A stud 30 on the needle 23 engages a suitable seat 31 on the needle 24 and communicates its clockwise rotation to that needle.

This general organization embodied in various forms, is well known in the art; and it is also well known that when, for any reason, the strain to be tested is suddenly relieved, as for example, by the breaking of a chain, the spring device recovers quickly and with such force that the teeth of the rack 26 or the pinion 25, or both, are injured and sometimes stripped, thereby rendering the instrument useless until new parts can be inserted.

The present invention prevents this injury by a simple attachment that may be readily applied to existing dynamometers as well as to new ones.

A yoke 33 extends across the middle portion of the spring device and has projections 34 and 35 extending laterally on opposite sides of the elements 10 and 11. The projection 35 may be perforated to receive the bolt 27 and hence be readily secured to the element 11 by that bolt. The projection 34 is loosely attached to the upper element 10 by a guide 37 which in this instance consists of a rod shouldered and threaded at one end 38, as shown in Fig. 2, and passing through a perforation 39 in the projection 34. This guide may take the place of the cap screw by which the frame 13 is usually secured in position.

The projection 34 is preferably inclined on its under face, as best shown in Fig. 1, and a wedge 40 lies between the projection and the adjacent surface of the element 10. A spring 41 constantly urges this wedge to the left in Fig. 1.

When the dynamometer is equipped with such an attachment, the wedge 40 moves to the left in Fig. 1 as the two elements 10 and 11 approach each other under the strain to be tested, occupying the space represented by such movement, prevents any rebound, and thus prevents the sudden movement of the rack and pinion that has heretofore caused the damage.

The wedge can be slowly withdrawn by tapping it on the smaller end or by inserting a light bar in one or more of the perforations 42 and prying against the side of the yoke.

The device is entirely automatic in operation, eliminating the human element and also permitting the operators to remain at a safe distance from the parts receiving the strain to be tested.

I claim as my invention:

1. In a dynamometer, the combination of a spring including two elements adapted to move relatively under the force to be measured, means indicating such movement in suitable units and an adjustable safety connection between the elements of the spring including a device moving as they move to take up the space represented by their movement and thereby prevent sudden recovery of the spring.

2. In a dynamometer, the combination of a spring including two elements adapted to move relatively under the force to be measured, means for indicating such movement in suitable units, means to prevent sudden recovery of said spring including a frame connected with one of said elements and projecting beyond the other of said elements, a wedge between the projecting portion of said frame and the said last mentioned element, and a spring for moving said wedge.

3. In a dynamometer, a mounting, a bow spring adapted to be flexed and a portion thereof moved relatively to the mounting in accordance with the force applied to said spring, an indicator to indicate the movement of said movable portion, with connections between said relatively movable portion and the indicator and a wedge between a portion of the mounting and the spring to take up the relative movement between the movable portion of the spring and mounting and prevent rupture of the connections between the spring and the indicator.

4. In a dynamometer, a bow spring, a mounting, said spring being adapted to be flexed and the middle portion thereof movable relatively to the mounting in accordance with the force applied to said spring, an indicator carried by the mounting to indicate the movement of said portion, non-expansible connections between said middle portion and the indicator, and safety means to take up the relative movement between the middle portion and mounting and prevent rupture of the connections between the spring and indicator by sudden release of the spring.

5. In a dynamometer, the combination of a spring of generally elliptical form, including two elements adapted to move relatively under the force to be measured, a yoke fixed with respect to one element and having a lateral projection on the remote side of the other element and a wedge between the projection and said other element.

In testimony whereof I affix my signature.

PERCY B. CAMP.